W. C. BANKS.
Seed-Planter.
No. 28,051.
Patented May 1, 1860.
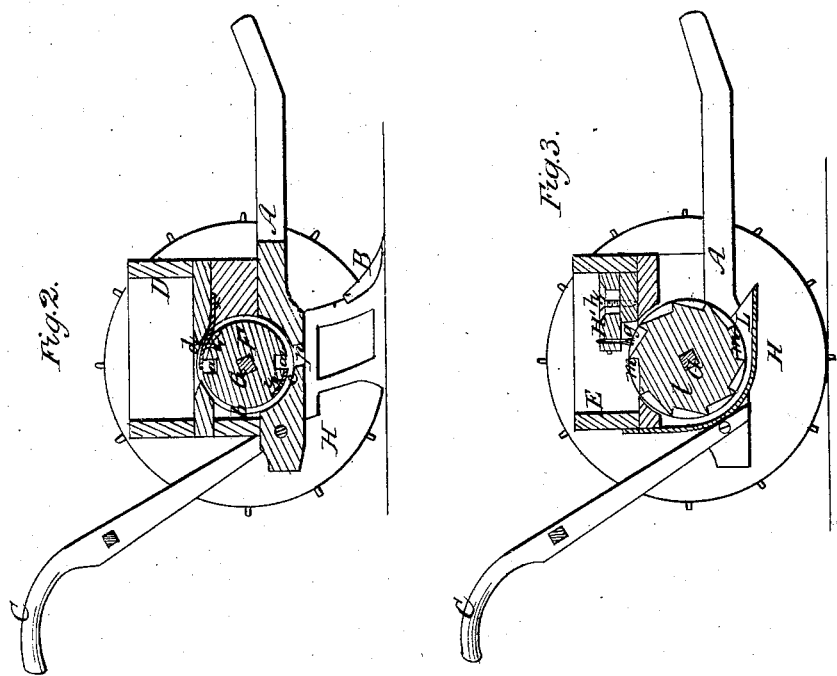
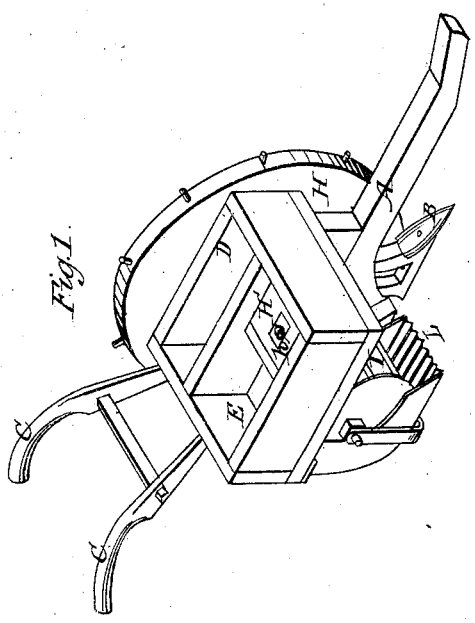
Witnesses.
E. Cohen
J. Hirsch
Inventor:
Wm. C. Banks

UNITED STATES PATENT OFFICE.

WILLIAM C. BANKS, OF COMO DEPOT, MISSISSIPPI.

IMPROVEMENT IN CORN-PLANTERS.

Specification forming part of Letters Patent No. 28,051, dated May 1, 1860.

*To all whom it may concern:*

Be it known that I, WM. C. BANKS, of Como Depot, in the county of Panola and State of Mississippi, have invented certain new and useful Improvements in Combined Corn and Grain or Seed Planters; and I do hereby declare that the following is a full, clear, and exact description of the construction and operation of the same, reference being had to the accompanying drawings, in which—

Figure 1 represents a perspective view of the entire machine. Fig. 2 represents a longitudinal vertical section through that part of the machine which constitutes the corn - planter. Fig. 3 represents a longitudinal vertical section through that part of the machine which is to be used as a seed-planter.

My invention relates to the arrangement of the seeding - wheel, the spring, and the seed-cell-adjusting device when operating together, as will be explained.

To enable others skilled in the art to make and use my invention, I will proceed to describe its construction and operation.

A represents the plow - beam, to which the plow B and handles C are secured. It also serves to support the seed box or hoppers D E.

D represents the hopper which contains the corn to be planted.

F represents a cylinder, which is secured to the shaft G of the driving wheels or wheel H, and which turns with the same. This cylinder has a groove, $b$, turned on its circumference, which contains the seed - cells $a$, which are to drop the corn in hills. The size of these seed-cells can be adjusted so as to increase or reduce their contents by means of an adjustable gage-plate, $c$, one shank of which is secured in the groove $b$ of the cylinder F by means of a screw, $i$, which passes through the slot $o$, and the other shank of which reaches into the seed - cell $a$, and being of the same width as said seed-cell will serve to enlarge or reduce the contents of the same when the gage-plate $c$ is adjusted.

$d$ represents a spring-plate, which is secured at $x$ to the frame of the machine. It rests in the groove $b$ of the cylinder F, and its object is to close the seed - cell when it is filled with corn from the hopper D, thus preventing any corn from escaping from the hopper to the ground, and dropping only what is in the seed-cell, and no more.

The construction of the seed-planter for sowing grain or other finer seed is as follows:

I represents a cylinder, which is secured to the shaft G, and which has cut out on its circumference a number of cells or buckets, $m$, which are filled with the seed as they pass through the seed-box E.

$g$ represents a brush, by which the quantity of seed which is to be discharged from the seed-cells can be regulated by adjusting the position of said brush. This can easily be effected by adjusting the position of the slotted board H, to which said brushes are secured, and by then securing the same by means of the set-screw $h$. As the cylinder I turns the seed is discharged on the inclined corrugated apron L, whence it is scattered over the ground.

In using this machine as a corn-planter the corn passes from the seed-cells $a$ through the aperture $p$ into a seed-tube of the common construction, and thence into the furrow made by the plow B, while when used as a seed-planter it operates in the above-described manner.

Having thus fully described the nature of my invention, what I claim therein as new, and desire to secure by Letters Patent, is—

The arrangement of the seeding - wheel F, with its flanges $b$, spring-clearer $d$, and adjusting device $c$, connected and operating together, substantially in the manner and for the purpose herein described.

WM. C. BANKS.

Witnesses:
E. COHEN,
I. HIRSCH.